April 18, 1967   A. A. BURRELL   3,314,700
CONNECTOR
Filed Feb. 14, 1964
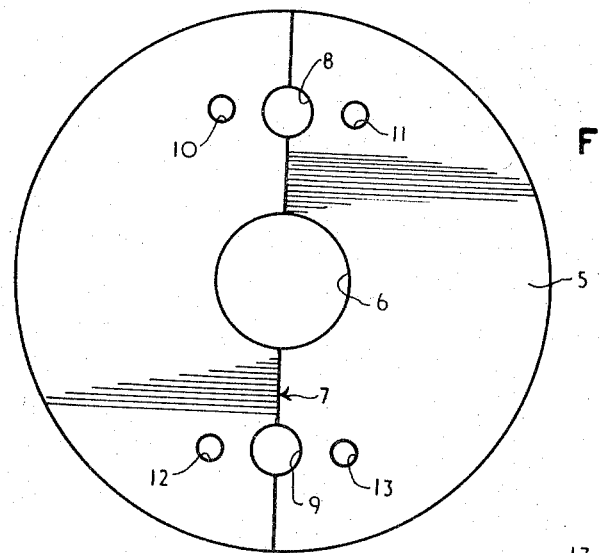
FIG. 1.
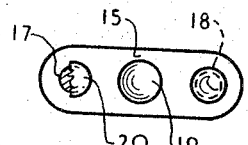
FIG. 2.
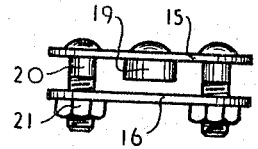
FIG. 3.
FIG. 4.
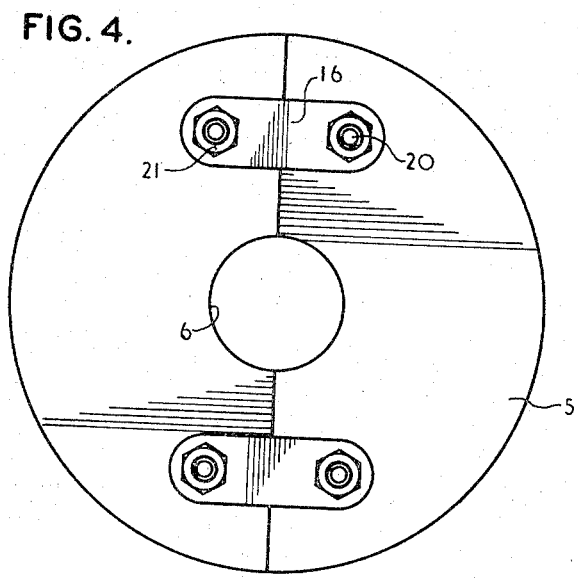
INVENTOR
ALFRED A. BURRELL
ATTORNEY

United States Patent Office 3,314,700
Patented Apr. 18, 1967

3,314,700
CONNECTOR
Alfred A. Burrell, 10323 106th St., Edmonton,
Alberta, Canada
Filed Feb. 14, 1964, Ser. No. 345,030
2 Claims. (Cl. 287—189.36)

This invention relates to improvements in a connector and appertains particularly to a connector device designed to couple two parts in true predetermined relationship; e.g. as in reuniting a diametrically divided wheel or the like in perfect original circumferential contour.

An object of the invention is to provide a simple connector capable of universal application that will assure the true and exact coupling in original relation of two split apart parts, where minimal tolerance is required.

A further object of the invention is to provide a connector for true and accurate coupling of sectionalized parts wherein the load or torque-carrying capacity means is independent of or separately identifiable from the exact positioning element, per se.

A further object of the invention is to provide a connector that will truly position the connected parts in their exact original or predetermined relation, provide the required load or torque-carrying capacity and impart the needed rigidity or product stability.

A further object of the invention is to provide a connector of the nature and for the purpose described that is characterized by structural simplicity, easy application and low cost of production whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like parts indicate like parts throughout the several views.

In the drawings:

FIGURE 1 is an elevation of a wheel drilled and marked for dividing into two equal segments by a diagonal cut;

FIGURES 2 and 3 are an elevation and bottom plan view respectively of the connector; and FIGURE 4 is a rear elevation of the wheel segments coupled in exact original relation by the connectors.

Many attempts have been made to produce a satisfactory two-part, quick-change type of wheel consisting of a pair of releasably connected, semi-circular plates. Uses for such a two-part wheel are numerous as for example where it is desired to change a gear or sprocket for one with a different diameter without dismantling the machinery or other parts on the carrying shaft. Existing two-part wheels rely, for the most part, on some extraneous mounting arrangements to provide for torque requirements and are chiefly deficient in that their joining mechanisms do not assure at all times that the assembled parts are in perfect position to provide exact reproduction of the original relationship nor supply the necessary torque requirements independent of extraneous product parts such as hub mountings or the like.

The present universally applicable device which I term "adapta-connector," is especially suitable for coupling in exact original relationship two or more split parts of a rotating product or other element. Additional to assuring perfect perimetral restoration, my "adapta-connector" furnishes the necessary torque requirement and provides also for the positioning and securing of the reassembled parts in true coplanar relationship.

For purposes of illustrating the use of the connector, I have shown it as employed to restore a circular plate. In FIGURE 1, the circular plate 5 will be seen to have an axial bore 6 and on a diametric line 7 there is provided on each side of the bore, equally spaced from the plate's center and approximately mid-way between the bore 6 and the plate's circumference, a circular hole 8 and 9 respectively. Equally spaced on each side of each hole 8 and 9 there are apertures 10–11 and 12–13 respectively, being on lines running at right angles to the line 7. These sets of three perforations consisting of hole 8 with its apertures 10 and 11 and hole 9 with its apertures 12 and 13 may be easily drilled as with a suitable jig.

The connector which may assume a wide variety of forms and shapes is shown in FIGURES 2, 3 and 4 as comprising a companion pair of elongated flat plates 15 and 16, each with a spaced pair of apertures 17 and 18 for registry respectively with apertures 10–11 or 12–13 of plate 5. Plate 15 has secured to one face, which for identification I term the inside, a stud 19 disposed midway between the apertures 17 and 18. This stud is of substantially the same diameter as the holes 8–9 and is designed to fit tightly therein and of a length no greater than the thickness of plate 5.

Connector plate 15 could be applied to the circular element 5 with stud 19 fitting tightly in hole 8 and apertures 17 and 18 registering perfectly with apertures 10 and 11 and connector plate 16 could be applied to the back of the circular element with its apertures 17 and 18 similarly arranged in perfect registry with apertures 10 and 11. To clamp the companion plates 15 and 16 tightly against opposite sides of the element 5, fastening means consisting of tight fitting bolts 20 passed through the registering apertures and nuts 21 threaded thereto are employed.

Accordingly, this invention contemplates the use of the connector device with such an element as plate 5 slit or separated as desired, as for example on the diametric line 7. Without regard then to the loss of material as may occur in the severance of the parts, the original perimetral form is restored exactly, the coplanar arrangement of parts assured and the product's torque requirements are supplied when the "adapta-connector" is subsequently applied as was hereinbefore described.

From the foregoing description taken in connection with the accompanying drawings, it will be manifest that a connector is provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A connector for coupling in exact original relation two split apart parts of an element, which element had a hole on its split line before separation and an aperture on each side thereof, comprising a pair of companion plates each having a pair of spaced apertures, the apertures in each plate registering with the pair of apertures one on each side of the hole in the element, a stud projecting from one of said plates intermediate of its pair of spaced apertures, said stud being of the same diameter as the hole in the element prior to the splitting thereof and no longer than the thickness of the element, and fastening means extending through the registering apertures whereby said stud assures the repositioning of the separated parts of said element in exact restoration both longitudinally and transversely of the split line.

2. For coupling two members that formerly existed as a single integer in their true original relation, a connector according to claim 1, wherein the companion plates may be disposed on opposite sides of the reassembled parts of the element with the apertures in the plates aligned with those in the element parts so the tightening of the fastening means clamps the companion plates tightly against opposite sides of the element parts assuring the coplanar relationship thereof and product stability and said stud fitting closely in the reconstituted hole on the split line enables the reassembled wheel to meet its torque requirements.

References Cited by the Examiner

UNITED STATES PATENTS

| | | | |
|---|---|---|---|
| 2,610,719 | 9/1952 | Hornbostel | 85—51 X |
| 3,082,637 | 3/1963 | Paxton | 287—189.36 X |
| 3,230,587 | 1/1966 | Lincoln | 287—189.36 X |

HARRISON R. MOSELEY, *Primary Examiner.*

CHARLES E. O'CONNELL, REINALDO P. MACHADO, *Examiners.*

J. K. BELL, *Assistant Examiner.*